United States Patent [19]
Hutchings

[11] Patent Number: 5,764,154
[45] Date of Patent: Jun. 9, 1998

[54] PASSIVE NON-ENERGIZED EARTHQUAKE DETECTOR

[76] Inventor: Sandra E. Hutchings, 1641 NE. 1st Ave., Pompano Beach, Fla. 33060

[21] Appl. No.: 783,741

[22] Filed: Jan. 16, 1997

[51] Int. Cl.$^6$ .................................................. G08B 21/00
[52] U.S. Cl. .................... 340/690; 340/392.1; 340/392.4
[58] Field of Search .................. 340/392.1, 393.1, 340/392.4, 392.5, 396.1, 690, 601, 500, 540; 116/150, 169; 181/122

[56] References Cited

U.S. PATENT DOCUMENTS

| | | | |
|---|---|---|---|
| 4,945,347 | 7/1990 | Perry | 340/690 |
| 5,072,208 | 12/1991 | Christensen | 340/392.4 |
| 5,252,786 | 10/1993 | Rinard | 73/652 |
| 5,587,697 | 12/1996 | Rent | 340/392.1 |

*Primary Examiner*—Brent A. Swarthout
*Attorney, Agent, or Firm*—Malin, Haley DiMaggio & Crosby

[57] ABSTRACT

An earthquake alarm that does not require batteries or other external power supply that supplies an audio alert with sound waves that can be detected by a human being, particularly useful in a bedroom to awaken a human being to notify them of an earthquake, comprising a plurality of sound-generating members, mechanically disposed extremely close together (at least within one-half inch of each other) and tethered from a frame that is supported from the ceiling so that upon vibration of the ceiling, the sound-generating members will be vibrated and bump into each other, causing a large amount of sound, which can readily wake someone up. In order to prevent inadvertent alarm signals because of wind currents, a wind deflector or shield is placed around the device to prevent wind from striking the device.

9 Claims, 2 Drawing Sheets

PASSIVE NON-ENERGIZED EARTHQUAKE DETECTOR

BACKGROUND OF THE INVENTION

1. Field of the Invention

This invention relates generally to earthquake detectors, and specifically, to an improved earthquake detector that does not require batteries or other highly technical, complex circuitry, but employs a plurality of mechanical chiming elements in conjunction with a predetermined enclosure for its operation.

2. Description of the Prior Art

Earthquake detection, especially in those particular geographical areas of the world that are especially prone to earthquakes, has been essential for the safety and well-being of building occupants. A plurality of sophisticated devices have been devised in the last few years which employ either electrical AC current or battery-operated power that are used for seismic-type energy detection in order to set off a particular earthquake alarm. In addition to the detecting complex devices, typically audio devices with speakers and other complex electrical equipment may be employed, all of which is costly and not always operable if, for example, the batteries are not operational.

U.S. Pat. No. 4,262,289, issued to Rivera Apr. 14, 1991, shows a seismic tremor sensor alarm which utilizes a battery-powered device with contact points and the like. U.S. Pat. No. 5,001,466, issued to Orlinsky, et al. Mar. 19, 1991, shows an earthquake detector that includes a battery power source, detection circuitry, and an alarm. The use of batteries and battery-powered equipment for something as critical as earthquake detection has a serious drawback that, since no one knows for sure at any given moment when an earthquake might occur, constant vigilance would be required to insure that the batteries are connected. If a direct power source were used such as found in outlets in a typical residence or business, there is no guarantee that the earthquake itself might not take out power lines and power sources.

The present invention overcomes the dependency found in the prior art on earthquake detectors by eliminating the need for artificial power to provide for detection and audio emergency noises. Sound is especially critical if people are asleep in a residence in order to wake them up sufficiently to evacuate the building. The present invention provides for a very loud sound and noise, sufficient from even a minor quake to completely wake up those surrounding the detector. While at the same time, the present invention does not require batteries or any kind of DC or AC power source for its operation.

SUMMARY OF THE INVENTION

An earthquake detector for use particularly inside an enclosure such as a building, including a residential home or the like, and in particular, the bedroom area, comprising a support means for attaching the detector to the ceiling, a frame for supporting a plurality of vertically supported members, a plurality of noise making members suspended freely from said frame in a vertical direction and placed at close, adjacent relationship (less than one-half inch) so that the vibration of the ceiling will cause the members to contact adjacent sound making members, causing them to radiate sound in all directions. By using a plurality of members, the amount of sound is greatly intensified so that if 10 or 15 or 20 members are used, a total noise effect is achieved. The device includes a surrounding air deflecting chamber that protects the device from sudden air currents which may be caused by heating or air conditioning within the room so that there is no false alarm presented. The surrounding housing does not in any way affect the sound transmission quality of the device since the top and bottom are open.

In a particular example, first of all, a hook or other type of fastener may be affixed to the ceiling and joist member for connecting the earthquake detector thereto.

In one embodiment, a rigid metal frame, which may be disk shaped, is connected by at least three chains to a ring that itself fastens to the hook in the ceiling. Therefore, the rigid, planar frame may be supported in a level manner by three equal length flexible rope or chain members attached to a central ring so that it is parallel to the earth.

A plurality of rigid sound members made of a particular material such as glass or metal that insures a distinctive, clanging sound when struck with another piece of glass, metal, or rigid object. Rigid, sound-generating members such as chimes may be suitable for use. In one embodiment, each of the members may be cylindrically shaped, quite thin in cross section, and elongated in length, approximately a foot long, and one inch in diameter. Each of the sound-generating members has an aperture disposed near its upper edge to which it is connected or tethered by a loose, flexible fastening means such as a rope, a string, or a chain to the triangular frame. A plurality of sound-generating members is envisioned that may include 10 or 20 individual members closely spaced together approximately one-half inch or three-quarters of an inch apart. In addition, rigid disks may be employed with a plurality of sound-generating members surrounding the disk which itself is suspended to allow for a plurality of sound-generating members to strike a centrally disposed central disk all at once for generating even more sound. Thus, with the additional sound-generating members, the sound-generating members themselves will strike the rigid disk, which could be in unison as opposed to necessarily striking an adjacent sound-generating member. In either case, the device will work, generating lots of sound as a function of the number of sound-generating members.

Attached also to the frame is an open cylinder that is open at both ends and hollow in the middle, of a very thin material, sufficient to stop gusts of wind from accidentally triggering a false alarm of striking the sound-generating members. This is mounted circumferentially around the outside laterally so that lateral wind currents will not affect the device. It may be sufficiently extended above and below the sound-generating members so that other currents cannot reach the sound-generating members. Although the most efficient shape is cylindrical, obviously other shapes could be used to prevent wind gusts from accidentally triggering the sound chimes. Other materials for the sound-generating members can be selected such as metal that specifically is tuned to give off particular frequencies for generating noise from the device. The size and shape of the sound-generating members may also be varied to change the tone of sound emitted.

In operation, once the device is suspended, preferably in a bedroom area, and the surrounding shield and housing installed, the device is ready for operation at any time. Any noticeable vibrations of the ceiling and the house will cause the sound-generating members, which are only one-half inch apart, from striking adjacent sound-generating members and a sound-generating disk if used, creating a large volume of noise which is sufficient to awake the soundest of sleepers during an earthquake. Note that the device is totally effective regardless of power failures and is not dependent on any other source of energy other than the earthquake vibration itself. Note also that there is no danger of false alarm or other accidental activation of the device.

It is an object of this invention to provide an improved earthquake detector that requires no auxiliary power source other than the earthquake itself.

It is another object of this invention to provide an audio earthquake detector that transmits an audio sound for people that does not include batteries or other electrical power source that can be utilized to provide audio sounds effectively generated by the earthquake itself.

And yet another object of this invention is to provide an earthquake detector of extreme dependability, effective audio warning sounds that eliminates batteries and other power sources for operation, and has an extremely high reliability rate since it is not burdened with complex mechanical parts.

In accordance with these and other objects which will be apparent hereinafter, the instant invention will now become described with particular reference to the accompanying drawings.

DESCRIPTION OF THE PREFERRED EMBODIMENTS

Figure 1:
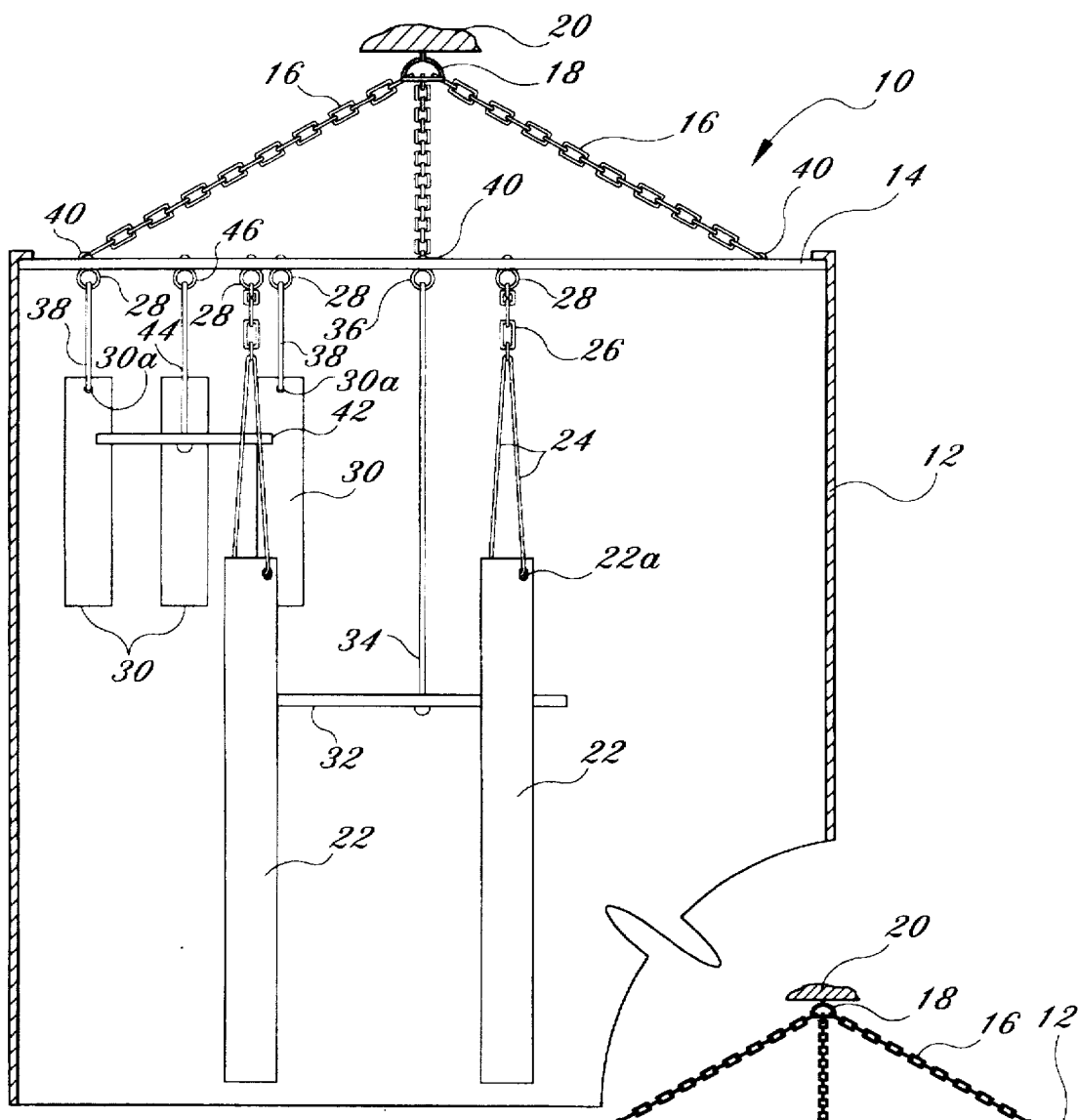
FIG. 1 shows a side perspective view of the present invention without the wind protective shield.

Referring now to the drawings, and in particular FIG. 1, the present invention is shown generally at 10, comprised of an outer wind shield which is cylindrical housing 12, supported by a rigid, circular frame 14 attached by a plurality of flexible members 16 attached to an eye 18 mounted into a ceiling 20. Based on the configuration of eye 18 and the flexible, elongated member 16, which could be chains, the frame, which may be rigid metal, 14 can be positioned so that it is parallel to the ground by virtue of the equal length of flexible chain member 16. Alternately, the rigid circular frame 14 could be comprised of a triangular rigid frame attached to a circular support member (not shown).

A plurality of elongated sound-emitting tubes which may be acoustically constructed for high resonance of sound 22 and 30 populate the inside of housing 12 and are all tethered or hung freely from the rigid frame 14. Each sound-generating member, for example 22, includes a string 24 through an aperture 22a in the tube, allowing it to hang freely from a chain 26 attached by fastener 28 to frame 14. Fasteners 40 are used to attach the flexible, elongated member 16 to the frame 14.

Smaller tubes 30, which include apertures 30a, are attached by string members 38 to a plurality of fasteners 28, all of which are attached to frame 14.

To enhance the operation of the device, additional disk-shaped, rigid members such as disk 32 and disk 42, which are mounted to frame 14 by an elongated member 34 and 44, which is attached to fastener 36 and 46, respectively, allows the rigid, disk-shaped members to be suspended with the sound-generating members 22 and 30 being spaced completely around the disk very close together. Although only three tubes are shown with each disk in FIG. 1, in actuality, the disks would be completely surrounded by sound-generating tubes spaced approximately one-half inch apart and one-half inch from the disk. Thus, any movement of frame 14 will clearly cause all of the sound-engaging members to strike either disk 32 or disk 42, while at the same time potentially engaging adjacent disks, creating plenty of audio energy that is sufficient to wake up a sleeping person. Note, however, that because of the wind shield 12, wind currents which might be caused in a room from an air conditioning duct or heat duct when the furnace comes on, will be prevented from causing the sound-generating members to move accidentally or inadvertently.

Figure 2:
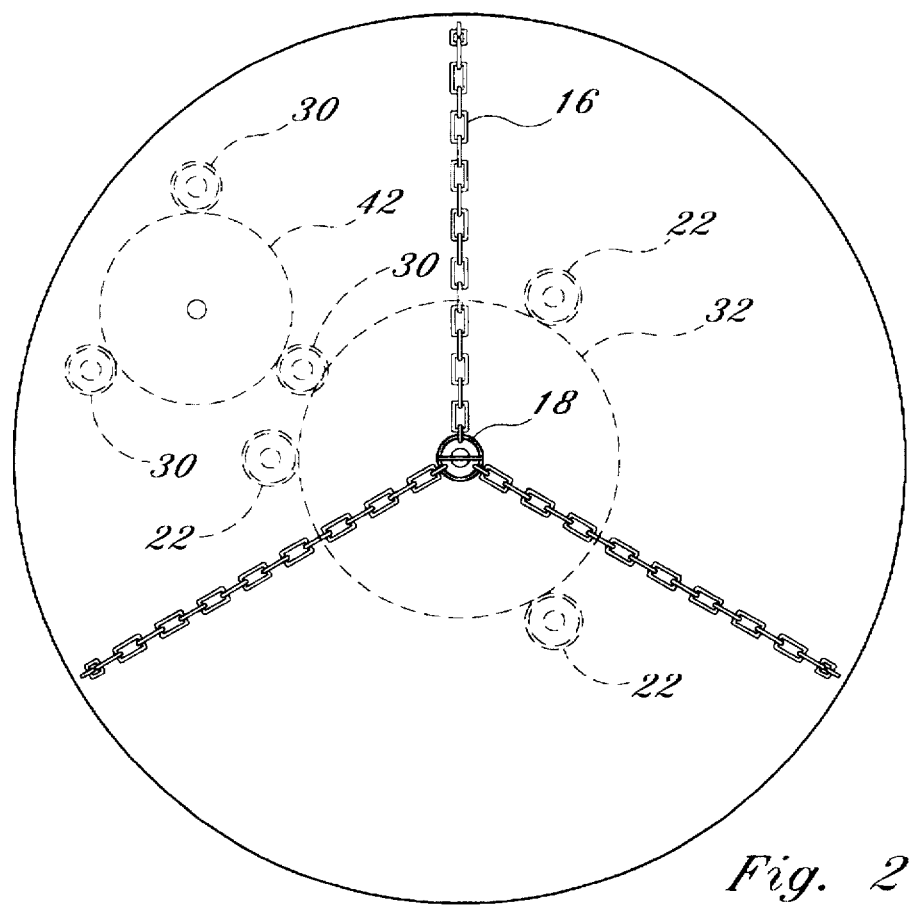
FIG. 2 shows a top plan view of the present invention.

Referring now to FIG. 2, a top plan view is shown with the chain member 16 and a supporting ring which is fastener 18 which attaches to the frame 14. The disks 32 and 42 are shown, along with tubular sound-generating members 22 and 30. Again, as discussed below, there would be many more sound-generating tubes placed just adjacent, but not touching, the disks, which can create the sound.

Figure 3:
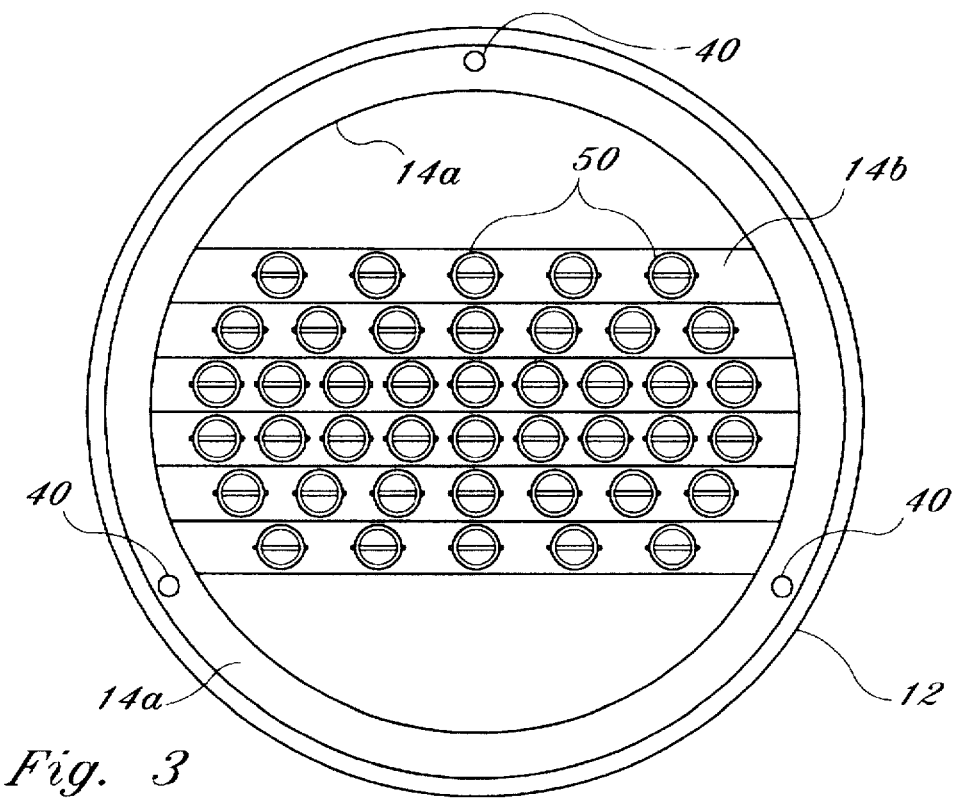
FIG. 3 shows a bottom plan view of the invention with the wind shield.

FIG. 3 shows an alternate embodiment of the present invention in a bottom plan view that shows a plurality of sound-generating tubes 50 bunched together in an overall array. In reality, the tubes would be much closer together, i.e. one-quarter inch in each direction, therefore, causing a tremendous sound generation when the frame moves, causing all the tubes to move randomly. Again, housing 12 surrounds the tubes, but the top and bottom of the tube are open. In this embodiment, frame 14, which supports all of the tubes from tethers or strings, is comprised of a series of rigid parallel frame members 14b attached to a circular rigid frame member 14a. Alternately, frame 14 can be one frame member with openings so that sound can be emitted (not shown). The primary part of frame 14 is a rigid, annular ring around the outside edge 14a and may include an additional number of linear, narrow frame members 14b parallelly disposed which allow attachment of each of the sound-generating tubes 50. Frame members 14b attach side-to-side from the circular portion of rigid frame member 14a. The frame 14a and 14b may be made of metal, plastic, or other rigid material. Fasteners 40 attach to flexible members 16 as in FIG. 1.

Figure 4:
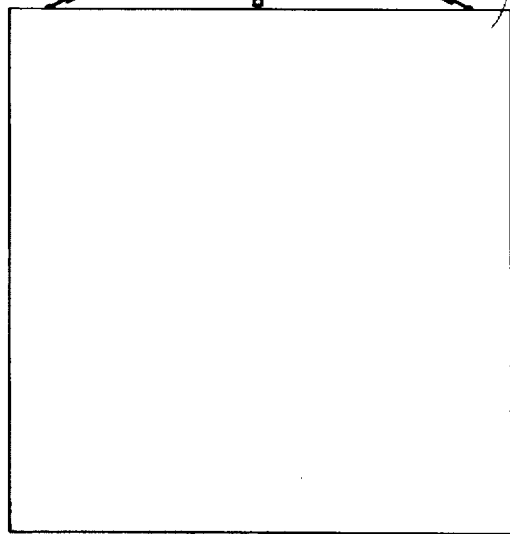
FIG. 4 shows a side elevational view of the instant invention with the wind shield attached.

Referring now to FIG. 4, the wind shield 12 is shown in the operating position as the device would hang in a desired location such as a bedroom.

In operation, because of the connection of the device to the ceiling, when an earthquake strikes, the ceiling will vibrate as will all the rest of the house, and will induce vibrations in the invention. With the sound-generating tubes close together, the slightest movement of the house will cause the chimes to emit a large amount of audio energy that will dissipate out and if, for example, disposed in a bedroom, would certainly wake the occupants, alerting them to the earthquake upon the onset of the vibration.

No batteries or other electrical power source is used. No audio speakers are used and the amount of audio energy available is a direct function of the number of sound-generating devices used.

Although tubes of glass or metal have been shown in the preferred embodiment, other types of sound emitting members can be used. Material and shapes may vary and crystal, or thin planar members of a particular material, or even specially designed, sound-emitting, vibrating, or resonant devices can be employed.

Although the device is shown particularly useful in a place such as a bedroom, it could certainly be used in other environments where people would not be readily aware of the occurrence of the quake at the onset. This could be in areas where people may be working or paying attention to something else and need an audio alert.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A mechanical, non-electric earthquake alarm, connectable to a building to detect movement of the building due to an earthquake, comprising:

a plurality of sound generating members for mechanically generating human audible sound when physically striking each other;

means connected to said sound generating members for tethering vertically said sound generating members;

a support frame connected to said means for tethering, for vertically suspending said sound generating members;

means for connecting said frame to said building, whereby movement of said building results in movement of said frame;

said plurality of sound generating members being disposed sufficiently close together so that the slightest earthquake vibration of said frame causes adjacent sound generating members to strike each other; and, shield means connected to said frame surrounding said plurality of sound generating members and extending vertically from said frame at least the length of the sound generating members to prevent air movement from striking said sound generating members to prevent a false alarm from air currents adjacent said sound generating members.

2. An earthquake alarm as in claim 1 wherein:

a plurality of said sound generating members surround at least one rigid disk;

said rigid disk is vertically tethered to said frame so that said disk is disposed parallelly to said frame;

whereby the slightest earthquake vibration of said frame causes adjacent sound generating members to strike each other and to strike said rigid disk.

3. An earthquake alarm as in claim 1 wherein;

each sound generating member is a hollow glass cylinder.

4. An earthquake alarm as in claim 1 wherein;

each sound generating member is a hollow metal cylinder.

5. An earthquake alarm as in claim 1 wherein; said sound generating members are disposed vertically within one/half inch of each other.

6. An earthquake alarm as in claim 1 wherein; said means for suspending said frame consists of at least one flexible support member.

7. An earthquake alarm for a building utilized by human beings providing audio energy that alerts a human being that an earthquake is in progress, especially to awaken a human being to notify of an earthquake, comprising:

a plurality of sound generating members for mechanically generating human audible sound;

at least one rigid disk;

means for vertically tethering said sound-generating members and said at least one rigid disk;

a frame connected to said means for tethering said sound-generating members and said at least one rigid disk;

means for vertically suspending said frame and connecting said frame to said building;

said sound-generating members being disposed sufficiently close together and sufficiently close to said at least one rigid disk, that the slightest earthquake vibration of said frame causes adjacent sound-generating members to strike each other and to strike said at least one rigid disk, generating a significant resonant audio sound; and, shield means connected to said frame, surrounding said sound-generating members and extending vertically from said frame at least the length of the sound generating members to prevent air currents from striking said sound-generating members to prevent false audio signals that do not indicate an earthquake.

8. An earthquake alarm as in claim 7 wherein;

said sound-generating members are disposed within one/half inch of each other.

9. A method for generating a human audible sound for alerting a human being occupying a room in a building that an earthquake is taking place, comprising the steps of:

(a) connecting a frame having a plurality of vertically tethered sound generating members to a rigid portion of said building room, said sound generating members spaced within one-half inch of each other;

(b) surrounding said sound generating members with a shield connected to said frame, the shield extending vertically from said frame at least the length of the sound generating members to prevent air currents from accidentally activating sound generating members and preventing any two sound generating members from striking each other due to an air current; and (c) disposing said frame in an area within said room and said building so that a human being occupying said room would be within sound distance of said sound generating members if said members are vibrated by an earthquake, whereby said method prevents the accidental generation of sound, indicating an earthquake, caused by air currents.

* * * * *